(12) United States Patent
Devine

(10) Patent No.: US 10,549,675 B2
(45) Date of Patent: Feb. 4, 2020

(54) PORTABLE LIVING STRUCTURE AND ASSEMBLY

(71) Applicant: Matt T K Devine, Los Angeles, CA (US)

(72) Inventor: Matt T K Devine, Los Angeles, CA (US)

(*) Notice: Subject to any disclaimer, the term of this patent is extended or adjusted under 35 U.S.C. 154(b) by 5 days.

(21) Appl. No.: 16/007,916

(22) Filed: Jun. 13, 2018

(65) Prior Publication Data

US 2018/0361906 A1    Dec. 20, 2018

Related U.S. Application Data

(60) Provisional application No. 62/519,477, filed on Jun. 14, 2017.

(51) Int. Cl.

| | |
|---|---|
| *B60P 3/36* | (2006.01) |
| *E04B 1/343* | (2006.01) |
| *E04H 1/02* | (2006.01) |
| *H02S 10/40* | (2014.01) |
| *B60R 15/04* | (2006.01) |
| *E03B 1/04* | (2006.01) |
| *B60R 15/02* | (2006.01) |

(52) U.S. Cl.
CPC ............... *B60P 3/36* (2013.01); *B60R 15/02* (2013.01); *B60R 15/04* (2013.01); *E03B 1/041* (2013.01); *E04B 1/34336* (2013.01); *E04H 1/02* (2013.01); *H02S 10/40* (2014.12)

(58) Field of Classification Search
CPC ... E04B 1/34336; H02S 20/30; E04H 1/1205; B60P 3/32; B60P 3/36; B60P 3/38; B60P 3/39; E03B 1/041; E03B 1/042
USPC ............................ 296/156, 168, 174; 52/143
See application file for complete search history.

(56) References Cited

U.S. PATENT DOCUMENTS

| | | | | |
|---|---|---|---|---|
| 2005/0225116 | A1* | 10/2005 | Fisher | B60P 3/341 296/168 |
| 2005/0253417 | A1* | 11/2005 | Cundy | B60P 3/07 296/168 |
| 2008/0258497 | A1* | 10/2008 | Oliver | B60P 3/36 296/168 |
| 2015/0291229 | A1* | 10/2015 | Connor | B62D 21/20 296/168 |

* cited by examiner

*Primary Examiner* — Dennis H Pedder
(74) *Attorney, Agent, or Firm* — Nixon Peabody LLP

(57) ABSTRACT

The present invention comprises a self-contained mobile living space that mimics the amenities of an entire residential property in order to affordably house individuals, particularly in urban environments. All living necessities are fused into one micro-living platform, independent of access to existing structures, land space, electricity, or sewage hookups, allowing landowners to rent out space with limited effort. The wheeled foundation allows the assembly to circumvent some of the existing urban building codes. In preferred embodiments, the various elements are configured in such a way that separate areas for sleeping, leisure, bathing, cooking, and gardening can be had atop a single compact space, with the use of exterior space maximized to heighten the sense of spatial availability for the occupant. The invention provides a novel alternative for affordable urban housing, exploiting available residential land without the expense, permitting, or effort associated with permanent construction on a non-portable foundation.

20 Claims, 10 Drawing Sheets

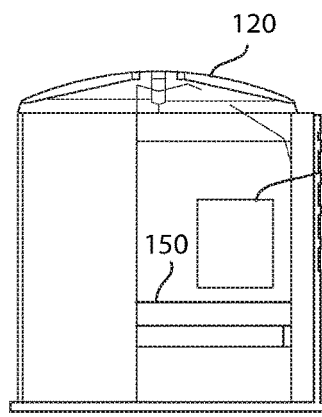
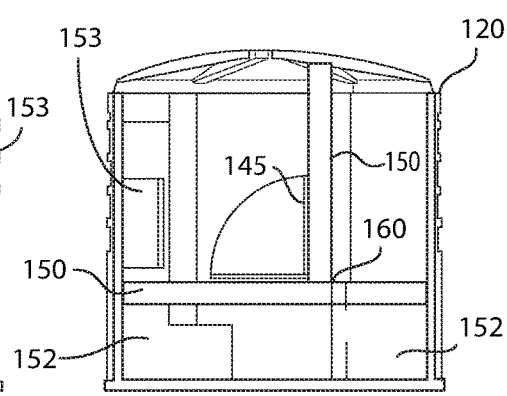
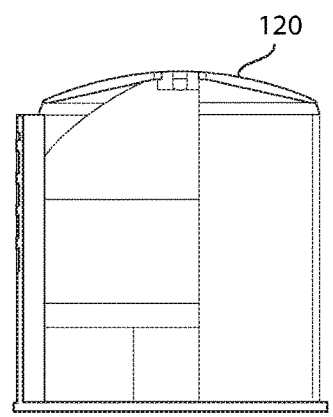
FIG. 2A  FIG. 2B  FIG. 2C
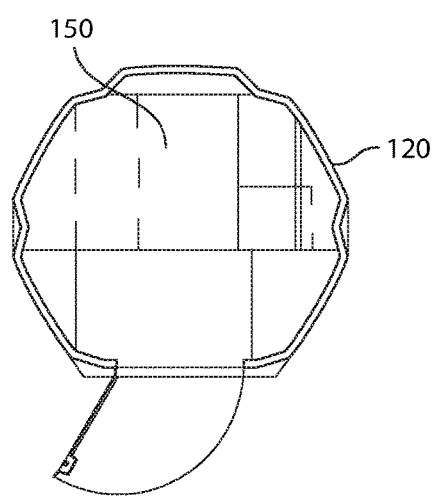
FIG. 2D

PORTABLE LIVING STRUCTURE AND ASSEMBLY

CROSS REFERENCE TO RELATED APPLICATIONS

This application claims the benefit of U.S. Provisional Application No. 62/519,477, filed Jun. 14, 2017, the entirety of which is hereby incorporated by reference.

FIELD OF THE INVENTION

The present invention related to self-contained mobile living spaces capable of affordably housing individuals. More specifically, the invention relates to housing that provides the amenities of an entire residential property, fused into one micro-living experience independent of access to existing structures, land space, electricity, water, or sewage hookups, allowing landowners to rent out space with limited effort.

BACKGROUND OF THE DISCLOSURE

Low-income city dwellers have a dwindling amount of available affordable housing options on the market and the economically homeless have little hope of re-entering the rental market. Mobile alternatives are either too pricey (i.e. typical "tiny homes" or new Recreational Vehicles), dilapidated (inexpensive, aging RV's), or altogether illegal. Landowners have limited building space but do have available land—with no apparent way to exploit it for profit or tax-write off.

Permanent housing solutions are finite and expensive. With restrictive building codes and strict requirements limiting the number of affordable housing units that developers are incentivized to build, it is increasingly challenging for cities to build affordable housing within reasonable proximity to centers of economic livelihood. The push for long-term temporary solutions fills a gap of housing the economically deprived. Placing structures on wheels not only provides a way around building codes, but allows an inhabitant to relocate from property to property without uprooting household routine.

Tiny houses on the market are too pricey and have limited or no outdoor space. Newer Recreational Vehicles are also pricey, fail to meet traditional neighborhood aesthetics, and are stigmatized in the city because of the number of unsightly mobile homes parked on city streets, creating a popular resistance to their presence in neighborhoods. There is no existing mobile living space on the market designed to park on available residential land in a dense urban environment. Alternative mobile units are built for camping and traveling, not urban dwelling.

The tiny homes on foundation often fail to meet urban building codes, are prohibitively expensive to build, cannot be moved and are owned by the landowner, not the occupant or charity program organizing distribution. Existing tiny house villages in cities require large lots specially permitted by cities and require the resident to enter a main building for kitchen and bathroom needs. Owners of land are often already maximizing occupancies within homes and buildings, leaving open residential yard space the only remaining alternative for financial gain from tenancy, short of committing great cost and effort to permit and build new structures on that property.

BRIEF SUMMARY OF THE INVENTION

As such, this invention addresses development of a solution to affordably house those who need it while incentivizing landowners to provide use of land for financial gain. Homeless and those struggling to make rent receive a more affordable, private housing alternative. Landowners profit from underutilized land with a low-effort tenant. The community benefits from housing residents who need it most, doing so in a low-impact, sustainable, cost-effective way that circumvents building code courtesy of its wheeled foundation. Therefore, a need exists in the urban housing market for a residential-land-compatible, affordable, mobile micro-housing alternative. A further need exists for all of life's routine household, courtesy of sustainable power and sanitation features and on-board garden and exterior space, to be contained atop a single unit so occupants can live on a property but independent of a house or building. Finally, there is a need to make this not only viable for the occupant but acceptable for the legal and aesthetic standards of a given neighborhood.

The present disclosure includes (i) a flatbed travel trailer no wider than about 8 feet 6 inches and no shorter in length than about 14 feet, (ii) bedroom and live-inside structure, no wider than about 8 feet and no longer than about 10 feet, mounted atop the flatbed, wherein the bedroom and live-inside structure includes a sectional platform assembly including a folding bed, fold-down table, and bench seating with accessible under-bench storage and energy efficient mini fridge, (iii) a separate structure houses toilet and shower, (iv) an outdoor kitchen area with gas grill, sink basin, and food preparation and eating surface, and (v) a rooftop trellis that shades the main floor space, as well as housing a garden irrigated by the gray water pumped upwards from the shower, toilet, and sink structures, and the mounting for on-board water tanks and solar panels which power the entirety of the unit. In another embodiment, the trailer may be shorter in length than 14 feet. In yet another embodiment, the bedroom and live-inside structure may be wider than 8 feet and longer than 10 feet.

EXEMPLARY EMBODIMENTS

Embodiment 1

A self-contained mobile living comprising:
a trailer;
a bedroom and living structure;
a portable restroom;
a rooftop trellis;
a water utility system; and
a gray water system;
wherein the bedroom and living structure, the portable restroom, and the rooftop trellis are placed on top of the trailer in a functional arrangement,
wherein the trailer comprises (i) at least one step to allow an occupant to step up to the trailer, (ii) at least one set of wheels to move the trailer, (iii) a pallet placed on a surface of the trailer that supports the bedroom and living structure, the portable restroom, and the rooftop trellis, and (iv) at least one outdoor desk, and
wherein the rooftop trellis comprises (i) at least one pillar that is configured to connect the rooftop trellis to the trailer, (ii) a ladder that connects the trailer to the rooftop trellis as to allow the occupant to climb up to the rooftop trellis from the trailer, and (iii) a rooftop garden that is irrigated by the water utility and the gray water systems.

Embodiment 2

The self-contained mobile living space of embodiment 1, wherein the bedroom and living structure comprises a foldable bed frame, a bench, a foldable desk, and a wall, wherein the foldable bed frame comprises a three-part sectional component, wherein the three-part sectional component comprises a head, a middle, and a bottom, wherein the head component is placed on top of the bench, wherein the middle component of the three-part sectional component is configured to fold upward towards a wall using a custom hinge, and wherein the custom hinge is configured to be hinged upward as to allow the bed frame to be held in an upright position, thereby creates additional space inside the bedroom and living structure.

Embodiment 3

The self-contained mobile living space of embodiment 2, wherein the foldable desk is located underneath the bed frame so that the foldable desk is exposed only when the bed frame is hinged upward.

Embodiment 4

The self-contained mobile space of embodiment 2, wherein the bedroom and living structure further comprises another bench that supports the bottom component of the foldable bed frame when the foldable bed frame is hinged downward for use.

Embodiment 5

The self-contained mobile living space of embodiment 1, wherein the trailer comprises a removable covering that encapsulates the trailer.

Embodiment 6

The self-contained mobile living space of embodiment 1, wherein the removable covering comprises at least one of: a window, a veil, a door, and any combinations thereof.

Embodiment 7

The self-contained mobile living space of embodiment 1, further comprising a set of braces that keep the trailer, the bedroom and living structure, the rooftop trellis, and the portable restroom in place when the trailer is in motion.

Embodiment 8

The self-contained mobile living space of embodiment 7, wherein the set of braces comprises at least one of: crossbrace, a single brace, an adjacent brace, and any combinations thereof.

Embodiment 9

The self-contained mobile living space of embodiment 1, wherein the trailer comprises a link at front of the trailer to be connected to a moving vehicle for transportation.

Embodiment 10

The self-contained mobile living space of embodiment 9, wherein the bedroom and living structure is placed at or near the front of the trailer.

Embodiment 11

The self-contained mobile living space of embodiment 9, wherein the portable restroom is placed at or near back of the trailer.

Embodiment 12

The self-contained mobile living space of embodiment 1, further comprising a solar system having a solar panel adhered to the rooftop trellis that is wired down to the bedroom and living structure and the portable restroom to provide electric power.

Embodiment 13

The self-contained mobile living space of embodiment 1, wherein the portable restroom comprises a shower stall, a composting toilet, and a urinal.

Embodiment 14

The self-contained mobile living space of embodiment 13, wherein the water utility system comprises:
a water heater;
a kitchen sink basin;
a fresh water tank;
an atmospheric water generator; and
a vertical pressure pump,
wherein the water heater is attached to the portable restroom and is configured to heat water for the kitchen sink basin and the shower stall,
wherein the fresh water tank contains fresh water collected from rain or captured from the atmospheric water generator,
wherein the vertical pump applies pressure to deliver the fresh water from the fresh water tank to the kitchen sink basin and the shower stall, and
wherein the water heater, the kitchen countertop, the fresh water tank, the atmospheric water generator, and the vertical pressure pump are connected to each other via at least one pipe line.

Embodiment 15

The self-contained mobile living space of embodiment 14, wherein the portable restroom comprises a sink opposite the kitchen sink basin and receives the fresh water from the fresh water tank.

Embodiment 16

The self-contained mobile living space of embodiment 14, wherein the atmospheric water generator is placed at a higher height than the fresh water tank as to deliver the fresh water to the fresh water tank using a gravitational force.

Embodiment 17

The self-contained mobile living space of embodiment 14, wherein the vertical pressure pump comprises an auto-detection feature that activates pump when faucets on the kitchen sink basin or the shower stall are activated.

Embodiment 18

The self-contained mobile living space of embodiment 14, wherein the gray water system comprises:

a grease trap located underneath the kitchen sink basin;

a kitchen sink drain connected from the kitchen sink basin to the grease trap so that waste material passes from the kitchen sink basin to the grease trap;

a shower stall;

a shower pump;

a shower drain pipe configured to carry waste water from the shower stall to the shower pump; and a gray water output pipe, wherein the grease trap and the shower pump comprise filters with microorganisms that act as antibacterial agent, and wherein the grease trap separates solid waste from the waste water for treatment, and wherein the grease trap sends the treated waste water to the shower pump for further treatment.

Embodiment 19

The self-contained mobile living space of embodiment 18, wherein the treated waste water in the shower pump is used in irrigating the rooftop garden via the gray water output pipe which connects the shower pump to the rooftop garden.

Embodiment 20

The self-contained mobile living space of embodiment 1, wherein the self-contained mobile living space comprises at least one of: wood, metal alloys, plastics, rubber, foam, aluminum, and any combinations thereof.

BRIEF DESCRIPTION OF THE DRAWINGS

Some elements of the invention are illustrated here to provide an example and are not limited by the figures of the accompanying drawings, in which like references may indicate similar elements and in which:

FIGS. 2A-2D depict blueprints from four perspectives for the interior of an example of a bedroom and living space, shown as a hexagonal structure that is constructed in accordance with the principles of the present disclosure.

DETAILED DESCRIPTION OF THE PRESENT DISCLOSURE

Figure 1:
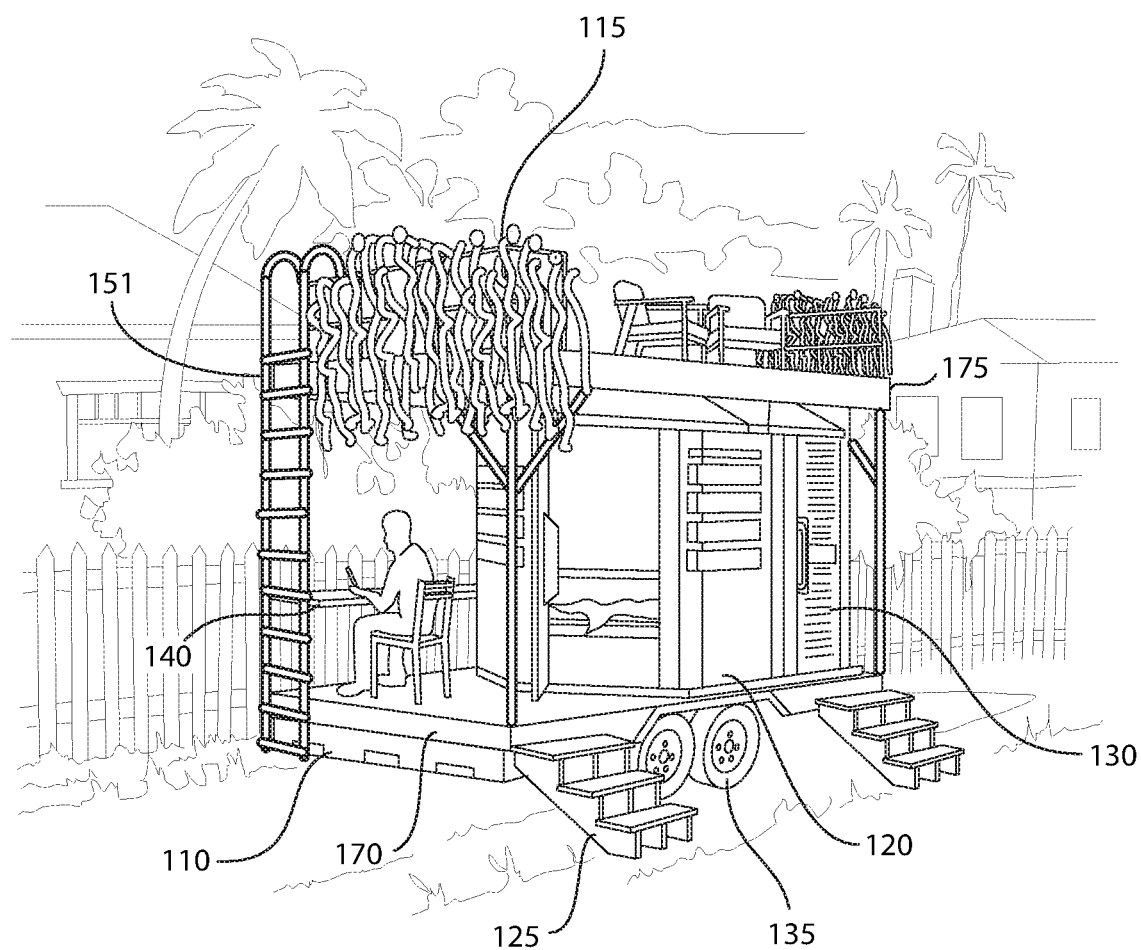
FIG. 1 depicts a side perspective view of an example of a self-contained mobile space that is constructed in accordance with the principles of the present disclosure. The elements include the main level bedroom and living structure, restroom, and outdoor space, as well as the rooftop trellis.

The disclosure and the various features and advantageous details thereof are explained more fully with reference to the non-limiting implementations and examples that are described and/or illustrated in the accompanying drawings, and detailed in the following description. It should be noted that the features illustrated in the drawings are not necessarily drawn to scale, and features of one implementation may be employed with other implementations as any person skilled in the art would recognize, even if not explicitly stated herein. Descriptions of well-known components and processing techniques may be omitted so as to not unnecessarily obscure the implementations of the disclosure. The examples used herein are intended merely to facilitate an understanding of ways in which the disclosure may be practiced and to further enable those of skill in the art to practice the implementations of the disclosure. Accordingly, the examples and implementations herein should not be construed as limiting the scope of the disclosure.

Unless stated otherwise, or implicit from context, the following terms and phrases include the meanings provided below. Unless explicitly stated otherwise, or apparent from context, the terms and phrases below do not exclude the meaning that the term or phrase has acquired in the art to which it pertains. Unless otherwise defined, all technical and scientific terms used herein have the same meaning as commonly understood by one of ordinary skill in the art to which this invention belongs. It should be understood that this invention is not limited to the particular methodology, protocols, and reagents, etc., described herein and as such can vary. The definitions and terminology used herein are provided to aid in describing particular embodiments, and are not intended to limit the claimed invention, because the scope of the invention is limited only by the claims.

As used herein the term "comprising" or "comprises" is used in reference to compositions, methods, and respective component(s) thereof, that are useful to an embodiment, yet open to the inclusion of unspecified elements, whether useful or not. It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). Although the open-ended term "comprising," as a synonym of terms such as including, containing, or having, is used herein to describe and claim the invention, the present invention, or embodiments thereof, may alternatively be described using alternative terms such as "consisting of" or "consisting essentially of."

Unless stated otherwise, the terms "a" and "an" and "the" and similar references used in the context of describing a particular embodiment of the application (especially in the context of claims) can be construed to cover both the singular and the plural. The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (for example, "such as") provided with respect to certain embodiments herein is intended merely to better illuminate the application and does not pose a limitation on the scope of the application otherwise claimed. The abbreviation, "e.g." is derived from the Latin exempli gratia, and is used herein to indicate a non-limiting example. Thus, the abbreviation "e.g." is synonymous with the term "for example." No language in the specification should be construed as indicating any non-claimed element essential to the practice of the application.

In describing the invention, it will be understood that a number of techniques and steps are disclosed. Each of these has individual benefit and each can also be used in conjunction with one or more—or in some cases all—of the other disclosed techniques. Accordingly, for the sake of clarity, this description aims to refrain from repeating every possible combination of the individual steps in an unnecessary fashion. Nevertheless, the specification and claims should be read with the understanding that such combinations are entirely within the scope of the invention and the claims.

An independently sustainable indoor/outdoor living space atop a flatbed trailer providing self-contained housing that mimics the amenities of an entire residential property is discussed herein. In the following description, for purposes of explanation, numerous specific details are set forth in order to provide a thorough understanding of the present invention. It will be evident, however, to one skilled in the discipline that the present invention may be practiced without these specific details.

FIG. 1 depicts a side perspective view of an example of a self-contained mobile space 100 that is constructed in accordance with the principles of the present disclosure. The self-contained mobile space 100 includes a main level bedroom and living structure 120, a portable restroom 130, and a rooftop trellis 175. The main level bedroom and living structure 120, the portable restroom 130, and the rooftop trellis 175 may be arranged in legible functional arrangement.

The self-contained mobile space 100 may further include a trailer 110 that forms a base for placing the main level bedroom and living structure 120, the portable restroom 130, and the rooftop trellis 175. The trailer 110 may include (i) at least one steps 125 to allow a user to go onto the self-contained mobile space 100, (ii) at least one set of wheels 135 to move the self-contained mobile space 100, (iii) a pallet 170 that is placed on top of the trailer 110 to support the main level bedroom and living structure 120, the portable restroom 130, and the rooftop trellis 175, and (iv) at least one outdoor kitchen counter and work/dining surface with the at least one kitchen counter 140. The at least one kitchen counter 140 may include a kitchen sink.

The trailer 110 may be connected to the rooftop trellis 175 by at least one pillar. The self-contained mobile space 100 may include a ladder 151 that is connected from the trailer 110 to the rooftop trellis 175, which allows the user to climb up to the rooftop trellis 175 from the second platform 170.

The rooftop trellis 175 may include a self-sustainable rooftop garden 115 that is watered by filtered water used by the user in the main level bedroom and living structure 120 and the portable restroom 130. In an embodiment of the present disclosure, the rooftop trellis 175 may be removable structure. In another embodiment of the present disclosure, the rooftop trellis 175 may be a singular structure and a part of the trailer 110. In an embodiment of the present disclosure, the portable restroom 130 may include a shower, a toiler, and the like.

The at least one set of wheels 135 may help the structure circumvent building codes, thereby allowing the self-contained mobile space 100 to be placed in, e.g., backyard of a home. A flat surface of the trailer 110 includes a strong and elevated foundation that allows for securing structural elements (e.g., main level bedroom and living structure 120, the portable restroom 130, and the rooftop trellis 175, at least one outdoor desk 140, and the like) while giving occupant a well-defined exterior space.

A compact bedroom and living space 120, outfitted with innovative storage and functional elements, provides a balance of utility and appeal, as well as defined privacy. The rooftop trellis 175 creates a rooftop space that gives an output for the gray water from the shower (and the kitchen or bathroom sink) inside the portable restroom 130 which saves the expense and trouble of utility connection or industrial waste vacuuming. The toilet inside the portable restroom 130 disposes waste without odor or invasive services and irrigates plants in the rooftop garden 115 with generated gray water, which help sustainably feed occupant and aide in shading the entire main-floor assembly. The rooftop trellis 175 may include house garden and solar panels that power the appliances and devices. The at least one outdoor kitchen counter/table/desk 140 allows for simple food preparation and keeps pests away from the main level bedroom and living structure 120. Each component works together to provide an independent living space, one which provides occupant with sustainable, portable housing and a host with a portable property that may not be subject to certain housing and zoning regulations, thereby helping to address homeless situation in major cities and towns.

FIGS. 2A-2D depict layout of the main level bedroom and living structure 120 configurations, shown as a hexagonal structure that is constructed in accordance with the principles of the present disclosure. Referring to FIGS. 1, and 2A-2D concurrently, the main level bedroom and living structure 120 may be secured to the pallet 170, which is secured directly to the trailer 110, and facing inward, allowing the occupant to open the door facing a dining area/open space. A at least one kitchen table 140 may be located in the foremost segment of the trailer 110, next to the portable restroom 130, to maximize floor space between the at least one kitchen table 140 and the main level bedroom and living structure 120. Having both kitchen table 140 and portable restroom 130 separate from the main level bedroom and living structure 120 means keeping out unwanted pests, sounds, and odors and maintaining privacy.

Figure 3:
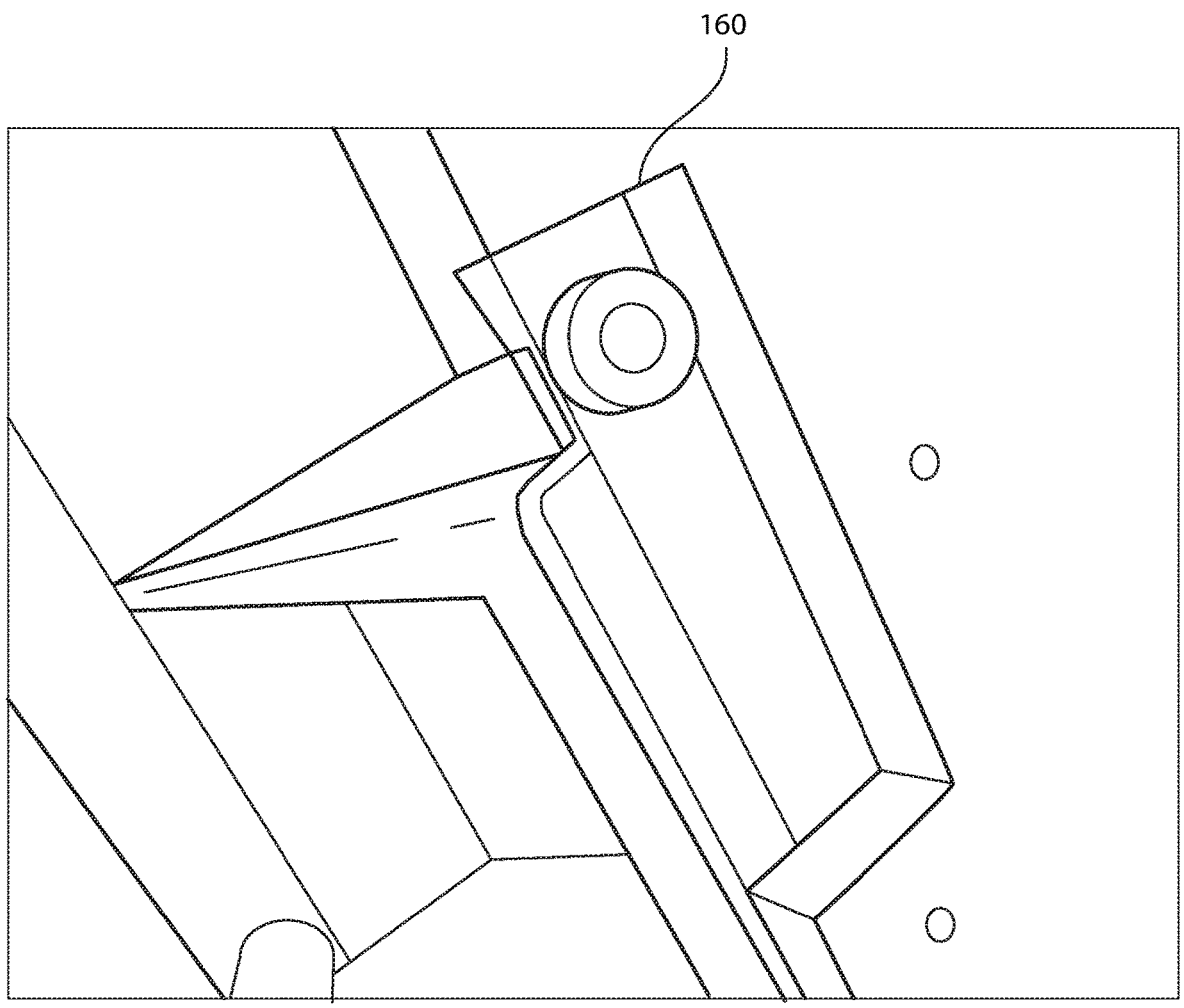
FIG. 3 depicts a side view of an example of a custom hinge that is hinged vertically to allow for a bed inside the bedroom and living structure to hinge up.

As shown in FIGS. 2A-2D, the central component of the main level bedroom and living structure 120 is a bed 150 which is custom-fabricated as a three-part sectional, the middle portion folding upwards towards the right wall to a 90-degree angle courtesy of a custom hinge 160 (as shown in, e.g., FIG. 3). The custom hinge 160 may be configured to be hinged upward as to allow the bed 150 to be held in upright position to create additional space inside the main level bedroom and living structure 120 and placed down when needed. Folding the bed 150 up and down requires a 4-part mattress, the fourth section comprising a thin strip along the bed hinge line so, when removed, the mattress isn't damaged and the bed hinges fully without obstruction. When hinged up, the bed 150 hides the wall's clothes hangar and reveals a bench 152 below the head of the bed 150. It also reveals a folding table 145, cut out from inside the underside of the bed 150's bottom platform. When hinged down, as depicted in FIG. 2A, the bed 150 rests on the upper platform above the bench 152. The main level bedroom and living structure 120 may also include a window 153 used for ventilation and overall décor of the structure.

Sequencing of fabrication of the elements in the self-contained mobile space 100 is vital in ensuring the stated elements are properly configured in the main level bedroom and living space 120. Measurement of the bed 150 occurs first, ensuring at minimum a twin-bed size dimensions for maximum length and width. The bed's folding feature begins as the centerpiece component of the space, requiring other components be developed around its three parts, with the "head" and "foot" surfaces of the bed fixed and the "middle" surface hinging towards and above the "foot" surface of the bed. The middle surface of the bed 150 is hinged at inner edge of "foot" surface of the bed 150 with a customized L-shaped hinge 160 sitting horizontal and fixed against sides of top of foot surface of the bed, and horizontal-to-vertical along the sides of the middle surface, so that upwards hinging motion exposes the foot surface.

In preferred embodiments, affixing a slide-lock latch to underside of the "middle" surface of the bed 150, with the long sliding pin on the underside of the "middle" surface and the loop lock attached to the constructed vertical wall of shelving support flush along the "foot" section of the bed 150. Construction of the "foot" surface of the bed accommodates a fridge, using the Danby DAR017A2BDD Compact 1.7 cubic-feet Fridge (50.8 cm) as an example of a fridge that best fits below.

Figure 4:
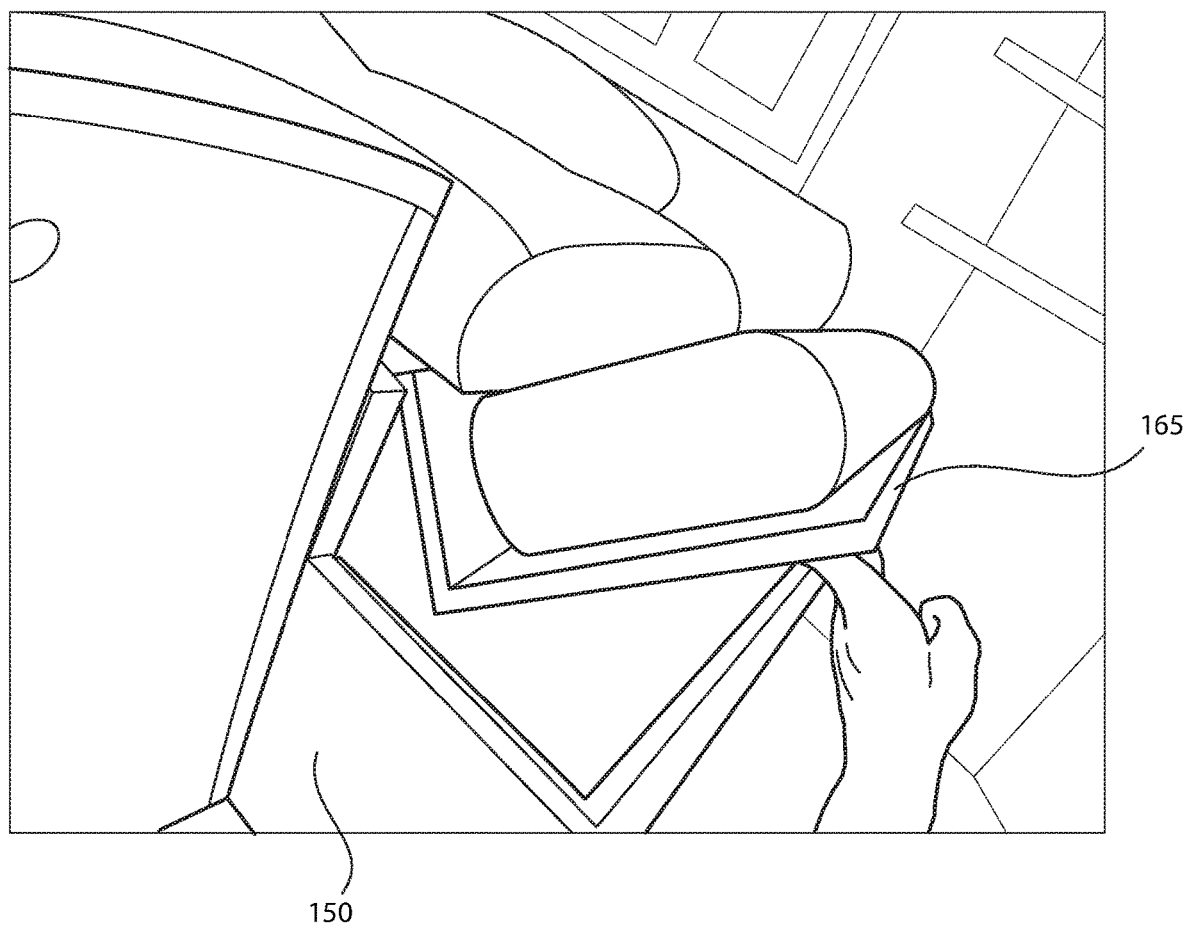
FIG. 4 depicts a side view of an example of a bench seat inside the bedroom and living structure as the bench seat hinges upward to allow for storage access.

In preferred embodiments, as seen in, e.g., FIG. 4, head surface of the bed 150 is matched to height specifications of the foot surface, accounting for slightly lower surface section on which middle section rests horizontally, and slightly higher section where ends of the middle and the head surface sections meet. The middle surface of the bed 150 may be measured and manufactured to clear shelving above the head of the bed 150, as well as the ceiling. The bed may be placed against a horizontal bench 165's surface (roughly 12" front-to-back, 5.5" of bench "back" height) which may be placed inside of the assembly supporting the head surface of the bed 150. The bench 165 may be cut into a double-surface hinge, indenting a piano hinge at the top of the back surface and another at the confluence of the back and seat surfaces, so that when the bed is lifted, the bench 165's back and seat fold upwards together, revealing the entirety of space beneath the bench 165 and the head of the bed 150.

Figure 5:
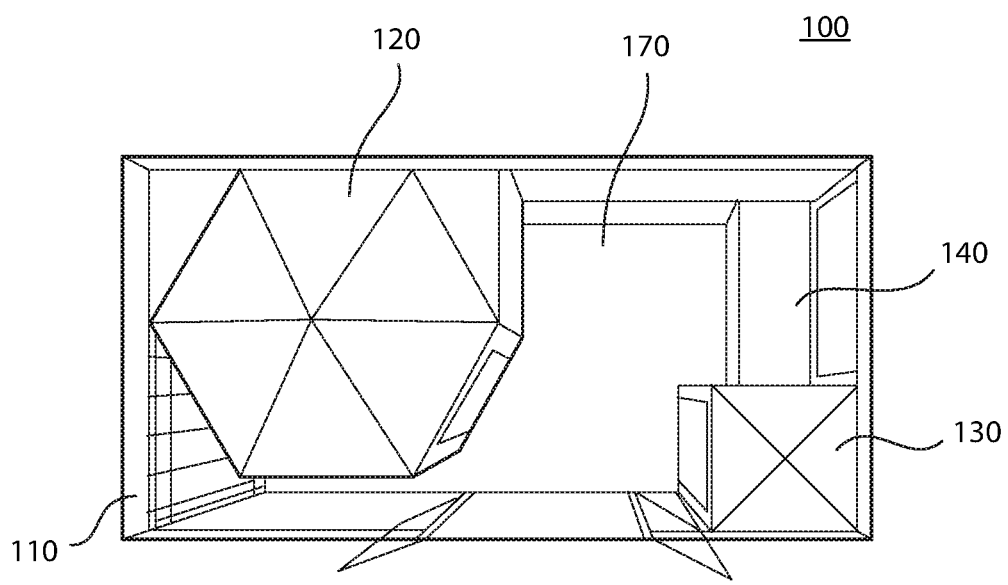
FIG. 5 depicts an overhead view of an example of the self-contained mobile space that is constructed in accordance with the principles of the present disclosure.
Figure 6:
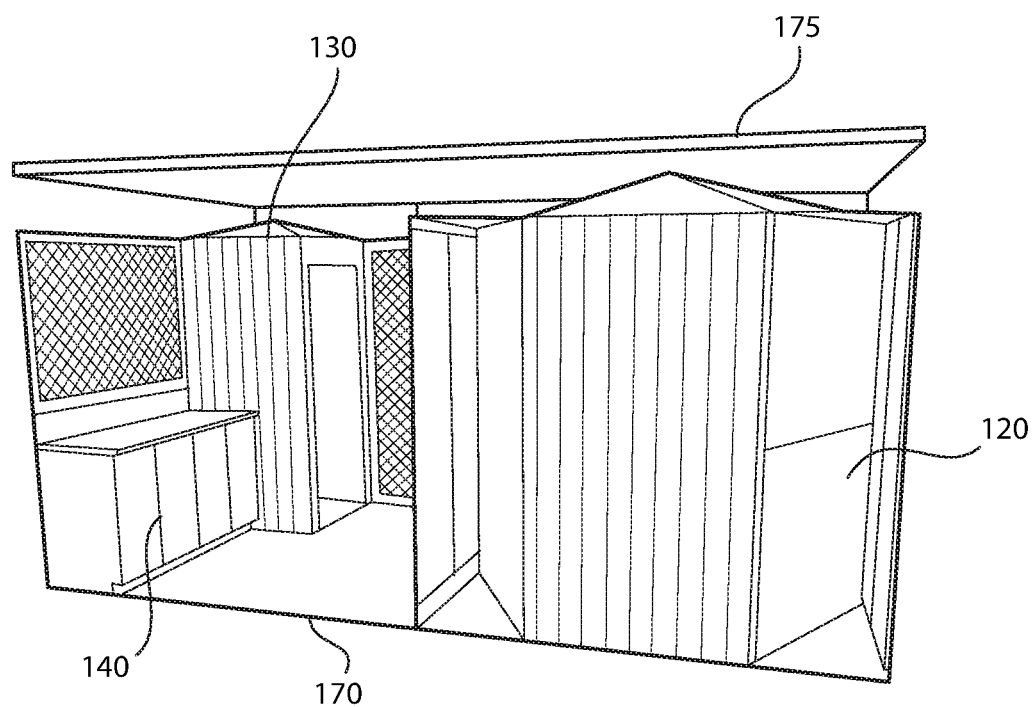
FIG. 6 depicts a side perspective view of an example of the self-contained mobile space that is constructed in accordance with the principles of the present disclosure.

FIGS. 5 and 6 depict an overhead and side perspective view, respectively, of another example of the self-contained mobile space 100 that is constructed in accordance with the principles of the present disclosure. The self-contained mobile space 100 includes a main level bedroom and living structure 120, a portable restroom 130, a rooftop trellis 175, at least one outdoor desk (or kitchen table/desk/counter) 140, and a trailer 110 (as shown in, e.g., FIG. 1). The trailer 110 forms a base for placing the main level bedroom and living structure 120, the portable restroom 130, the at least one outdoor desk 140, and the rooftop trellis 175. The trailer may include a pallet 170 that is placed on top of the trailer 110 to support the main level bedroom and living structure 120, the portable restroom 130, and the rooftop trellis 175, and the at least one outdoor desk (or kitchen space) 140. The trailer 110 may include at least one wall (or fence) 113 that encapsulates the main level bedroom and living structure 120, the portable restroom 130, and the outdoor desk (or kitchen space) 140 as to provide additional privacy for the occupant. The wall may include, e.g., window, door, opening, and the like.

Figure 7A:
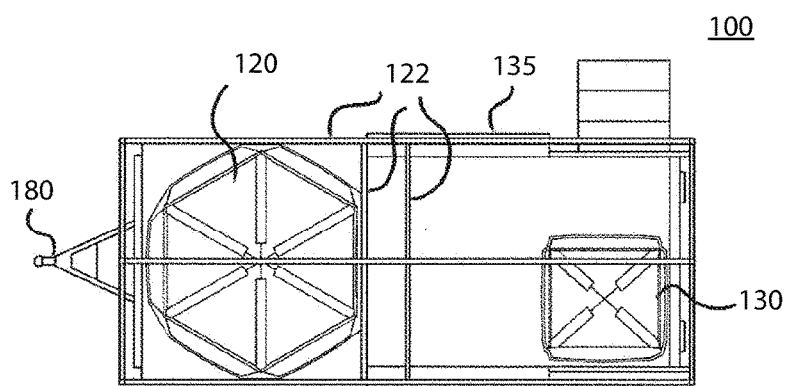
FIGS. 7A-7C depict a top, side, and back view of an example of the self-contained mobile space that is constructed in accordance with the principles of the present disclosure.
Figure 7B:
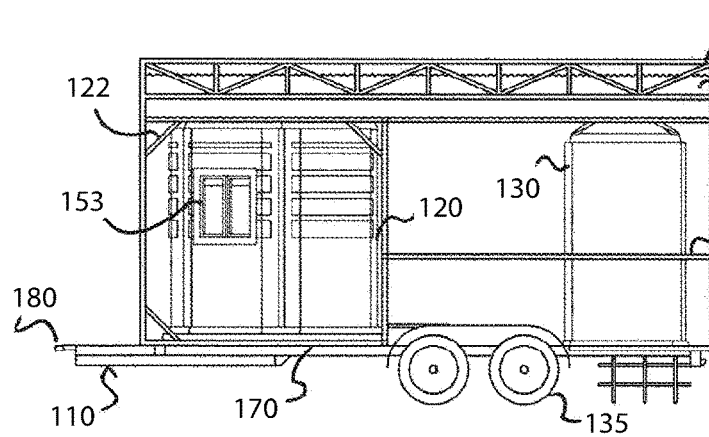
Figure 7C:
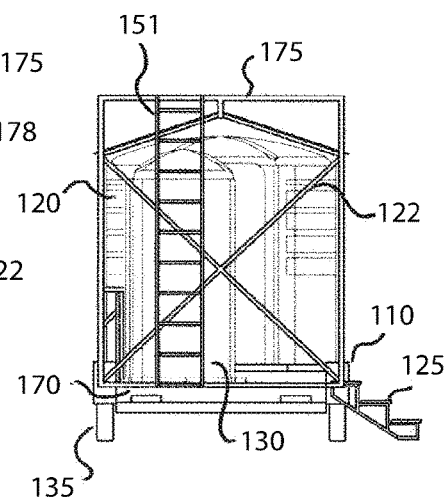

FIGS. 7A, 7B, and 7C depict another a top, side, and back view, respectively, of an example of the self-contained mobile space that is constructed in accordance with the principles of the present disclosure. The trailer 110 may include a set of braces 122 as either a cross-brace as shown in, e.g., FIG. 7C, or at corners as shown in, e.g., FIG. 7B. These braces help keep the elements of the self-contained mobile space from moving off the trailer while in motion and stabilize the structural integrity of the entire self-contained mobile space. The trailer 110 may further include a link or a rail 180 that is configured to be linked or connected to, e.g., a truck, for transpiration. The main level bedroom and living structure 120 may be located at or near a front of the trailer 110 close to the rail 180. The portable restroom 130 may be located at or near a back of the trailer 110 located opposite from the front of the trailer 110 as to lessen the potential exposure of the occupant in the main level bedroom and living structure from exposure to potential odor, bacteria, and gray water, thereby increasing an overall living condition of a portable living structure that is not found in currently available portable living structures and tiny homes.

Figure 8:
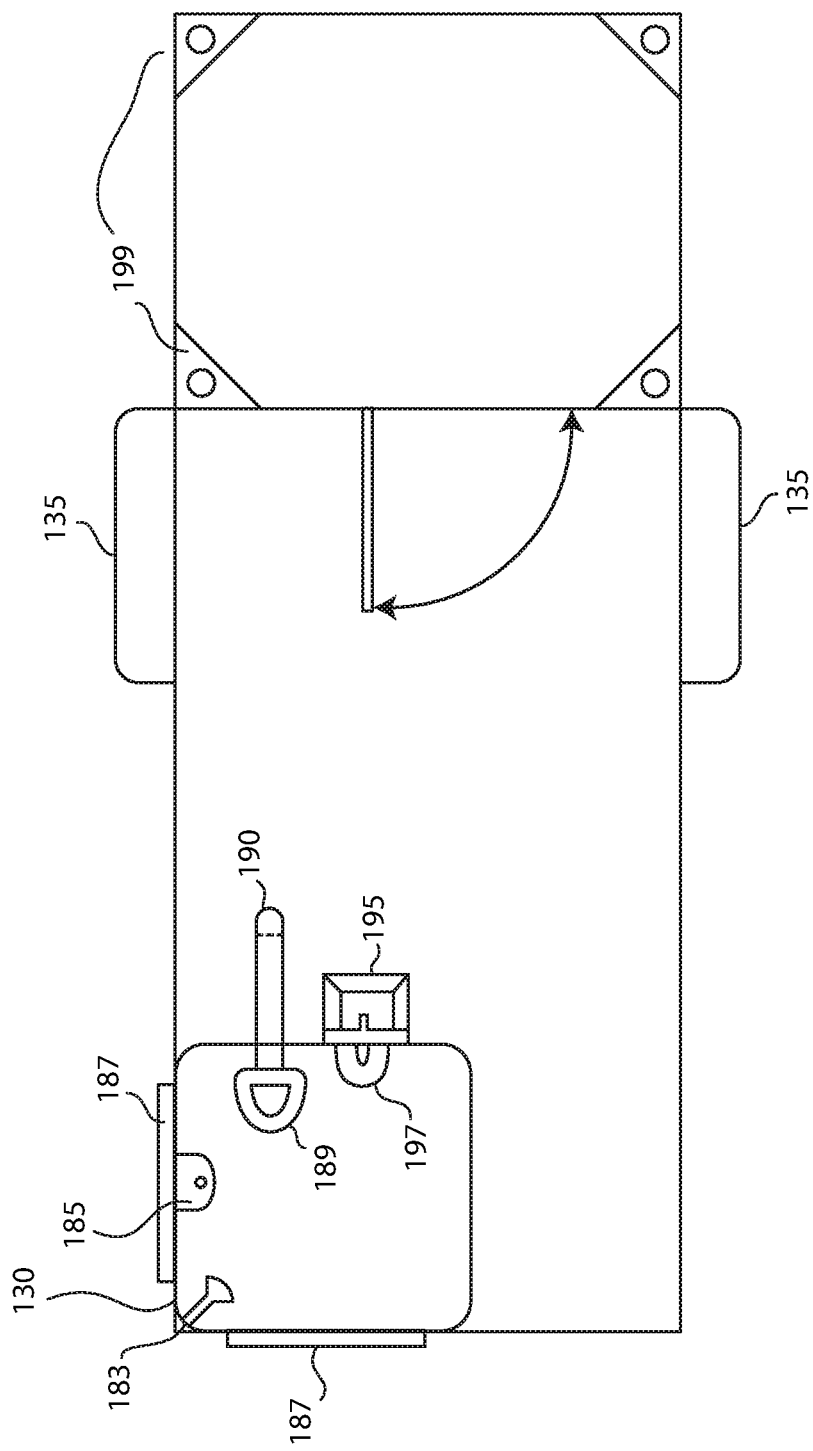
FIG. 8 depicts an overhead view of an example of a utility system of the self-contained mobile space that is constructed in accordance with the principles of the present disclosure.

FIG. 8 depicts an overhead view of an example of a utility system of the self-contained mobile space that is constructed in accordance with the principles of the present disclosure. Referring to FIGS. 1, 5, 6, and 8 concurrently, the utility system may include a solar system which starts with a series of panels 187 (e.g., 4-100 watt, less than 4 watt, or greater than 100 watt) adhered to a rooftop grate in the rooftop trellis 175 (alongside the rooftop garden 115) and wired down to a 4-battery bench (not shown) on the main level bedroom and living structure 120, with adjoining circuit hubs and breakers and inverter mounted nearby (not shown). The batteries in the 4-battery bench would power, e.g., a fridge (inside the main level bedroom and living structure 120), outlets for devices (inside the main level bedroom and living structure 120), and atmospheric water generator 199 (outside the main level bedroom and living structure 120, caged/locked). The atmospheric water generator 199 may be placed outside the main level bedroom and living structure 120 at a height slightly above a water tank (not shown), filling the tank below the at least one outdoor desk (or kitchen counter) 140 (across from the battery bench). A pump system (not shown) would then carry the water both up to the kitchen sink basin 195 (which sits in the counter) and bathroom sink 197, and into the shower stall 183. Both would empty into a shower pump where the kitchen sink basin 195 and the bathroom sink 197's water drains first through a grease trap before being pumped up to the rooftop garden 115 for dispersing in the planters. An auger composting toilet 189 may be installed in the portable restroom 130, with a circular hole allowing for the horizontal "auger" tube to corkscrew the waste into a half-bucket 190 placed under, e.g., the kitchen basin.

Figure 9:
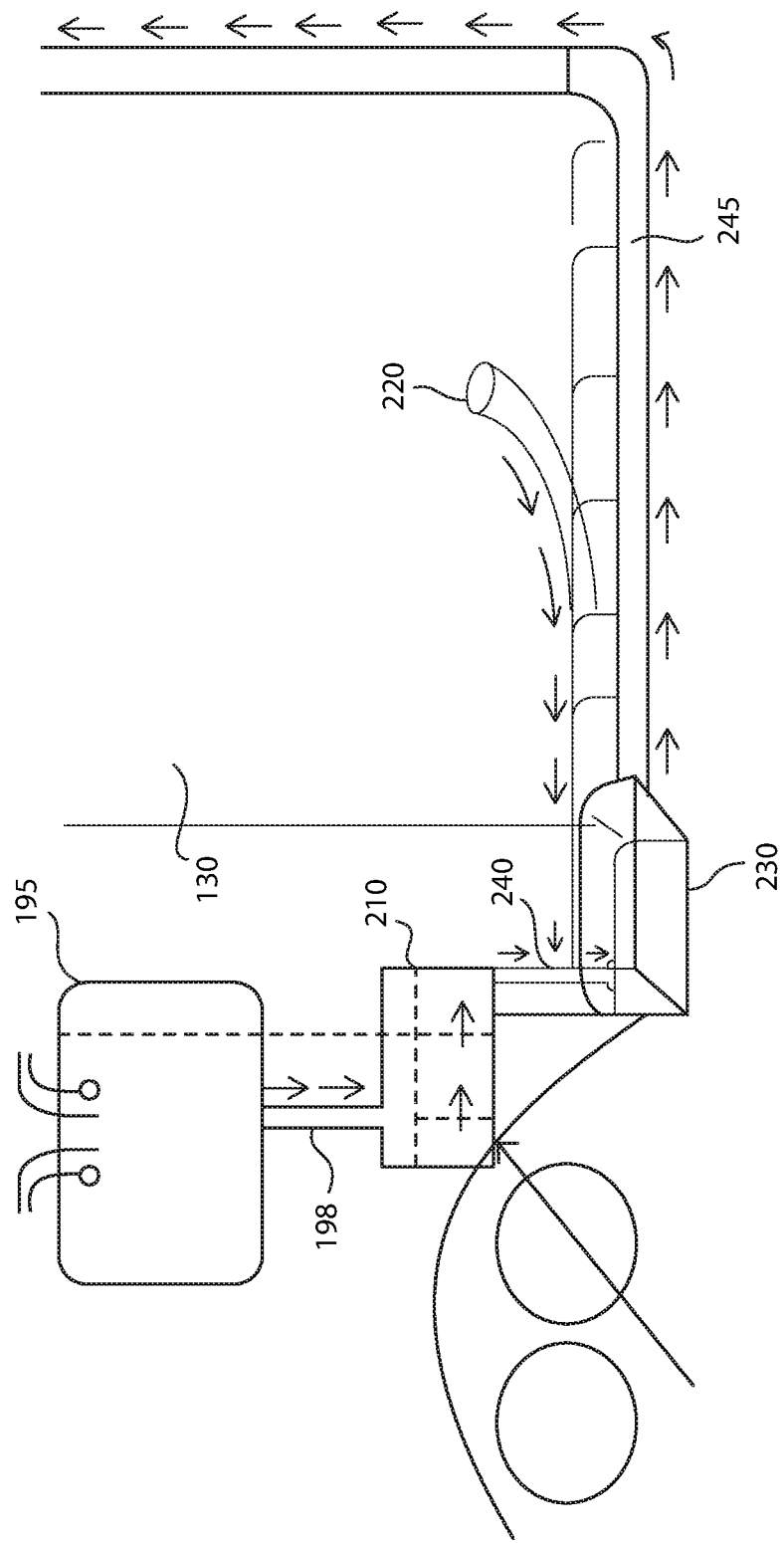
FIG. 9 depicts an example of a gray water system used in the self-contained mobile space that is constructed in accordance with the principles of the present disclosure.

FIG. 9 depicts an example of a gray water system used in a self-contained mobile space that is constructed in accordance with the principles of the present disclosure. Referring to FIGS. 1 and 9 concurrently, the gray water system includes a kitchen sink basin 195, a kitchen sink drain 198, a grease trap 210, a shower pump 230, a shower drain pipe 220, and a gray water output pipe 245. The grease trap 210 may be placed underneath the kitchen sink basin 195 and a waste material (e.g., food scrap, liquid, etc.) is passed from the kitchen sink basin 195 to the grease trap 210 through the kitchen sink drain 198. The grease trap 210 includes a filter with microorganisms that clean the waste introduced through the kitchen sink drain 198, cleaning water in the waste by acting as an antibacterial agent. The waste is then as moved towards the shower pump 230, which also includes microorganisms used for killing harmful bacteria. The shower pump 230 also receives water from a shower inside the portable restroom 130 through the shower drain pipe 220. Afterwards, the resulting purified/cleaned gray water from the shower and the kitchen sink drain 198 is then introduced to plants in the rooftop garden 115 via the gray water output pipe 245, thereby irrigating the plants in a sustainable manner.

The advantage of the disclosed gray water system is utilizing both the shower and sink basin drains lead to the shower pump, which includes a vital float switch that powers on the device to action the water pump to direct the water upwards through the gray water output pipe 245 towards the rooftop garden.

The gray water system may further include a gray water tank (with additional organic cleansing functions) installed just below the rooftop garden 115 (above the portable restroom 130) on the way to the garden dispersal.

The rooftop garden 115 may include a roughly 6" deep series of soil pots with various plants and gray water dispersal pipes irrigating them. In another embodiment, the rooftop garden 115 may include a greater or less than 6" series of soil pots.

Figure 10:
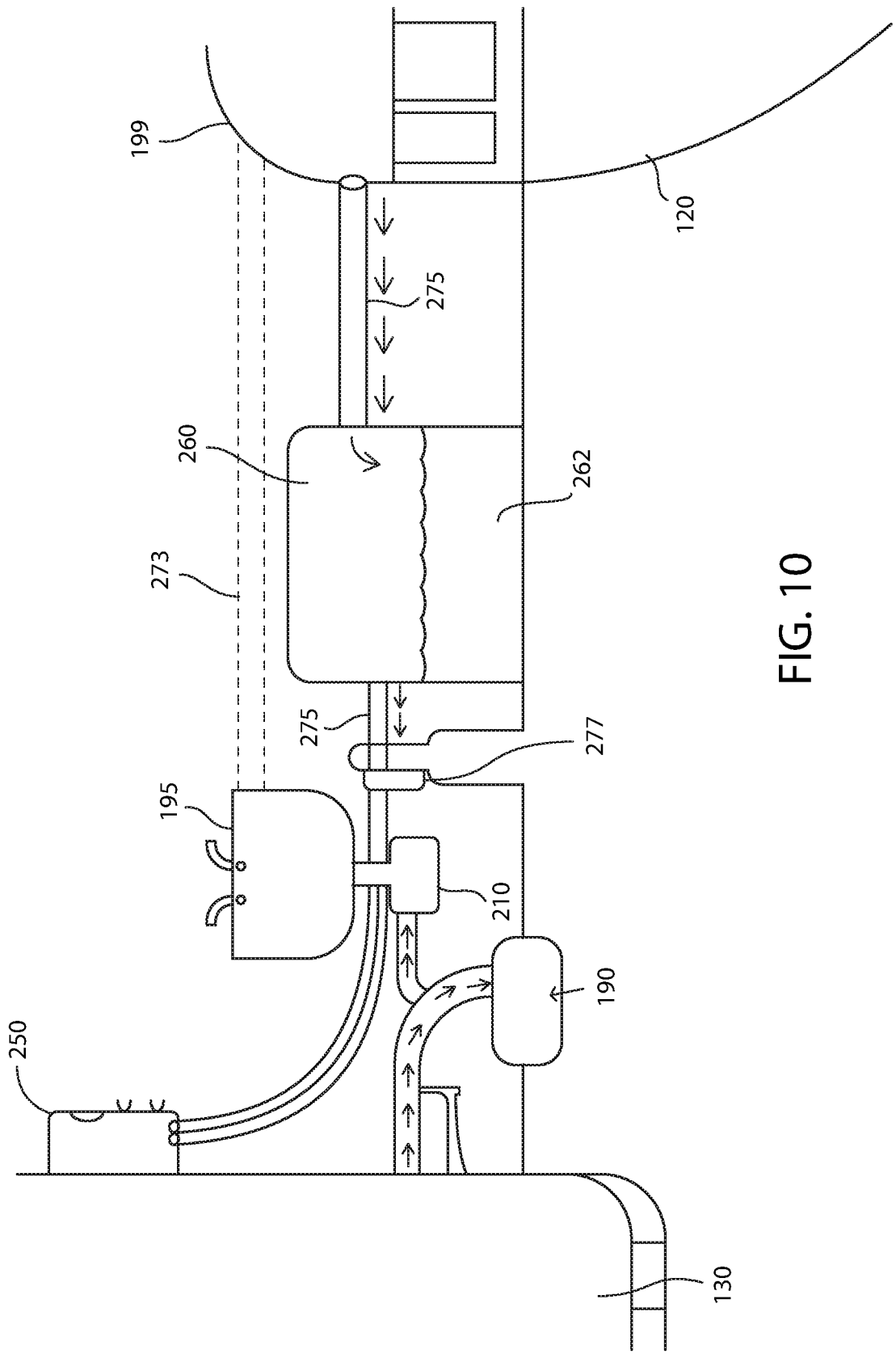
FIG. 10 depicts an example of a water system used in the self-contained mobile space that is constructed in accordance with the principles of the present disclosure.

FIG. 10 depicts yet another example of a utility system used in the self-contained mobile space that is constructed in accordance with the principles of the present disclosure. Referring to FIGS. 1, 8, 9, and 10 concurrently, the utility system includes (i) a water heater 250 that is attached portable restroom 130 that heats both the kitchen sink basin 195 placed outside the portable restroom structure 130 and the shower inside the portable restroom 130 through at least one pipe line 275, (ii) a kitchen countertop 273, (iii) a fresh water tank 260 that contains fresh water 262, (iv) atmospheric water generator 199, and (v) a vertical pressure pump 277. The fresh water tank 260 stores and transmits water 262 through the vertical pressure pump 277 to the kitchen sink basin 195 and the shower. The water 262 may be transmitted using at least one pipe line 275. The at least one pipe line 275 is also configured to heat the water 262 as it moves from the fresh water tank 260. The vertical pressure pump 277 may include an auto-detection feature that activates pump when faucets (shower or sink) are activated, which is a critical feature for energy conservation. The atmospheric water generator 199, which transmits water 260 to the fresh water tank 260, may be configured to be placed at a higher height than the fresh water tank 260 as to use the gravity to transmit water 260 to the fresh water tank 260.

In preferred embodiments, general sequence of construction of the self-contained mobile space goes as follows: secure the bedroom structure atop the finished flatbed trailer; outfit the structure with insulation before wiring for electricity and framing the interior, adding bed as described and following with shelving and storage surfaces; secure restroom structure and kitchen and dining space to the trailer; connect plumbing elements to shower, toilet, and sink basin; install rooftop trellis, anchoring trellis stems to trailer and connecting bars for roof, ladder, and railing before adding floor of roof; and connect plumbing to rooftop structure and placing garden and solar power elements, along with water tanks for shower and sink. Finishing touches may include ventilation, lighting, and side curtains, as well as customized decor.

The construction of the invention is not dependent on any given material. Wood, metal alloys, plastics, rubber, foam, aluminum, and other materials may comprise some or all of the elements of this invention. While all listed elements are necessary to creating an independent, sustainable portable micro-home acceptable for an urban landscape, the addition of supplemental elements of sustainability—including an atmospheric/rain water capturing system—may bolster the independent functionality of the unit, as could substitute elements. Conversely, replacing sustainable features with traditional power, water, and waste systems may increase functionality despite compromising the unit's independence.

Similarly, configuration of elements can be arranged in alternate ways to highlight differing aspects of performance strength of the invention. The bedroom structure, bathroom structure, and kitchen and dining space can be configured on the floor plan in a variety of ways. The structures themselves may be portable toilet, or wooden tiny homes, pre-fab metal spaces, other less unique structures, or entirely customized structures. Each structure may be built into the rooftop trellis, and/or the trellis itself may be scrapped to keep the unit as a single-level. The bed can be measured, placed, and hinged differently, as well as all interior elements such as the bench and shelving. The toilet may deviate from incinerating or vacuuming into composting or other non-flushing systems. The invention's intended use is within urban environs, but can be used for recreational purposes as well, providing an off-grid living space for rural dwellers, festival attendees, emergency housing, and alternative travelers, and/or modified to meet needs of disaster relief housing, camping or "glamping", rural homesteading, or construction site security or short-term remote employee housing.

Modification of the invention may incorporate stackable versions, ala storage container homes but with built-in outdoor space. Further modification may include having a building with a foundation. Attaching this model to a motorized vehicle, rather than a trailer requiring manual hookup, increases mobility. Doing so on an amphibious or strictly marine vessel, with permanent flotation devices to buoy the unit, would allow for maximum range of utility.

Although the present invention has been illustrated and described herein with reference to preferred embodiments and specific examples thereof, it will be readily apparent to those of ordinary skill in the art or discipline that other embodiments and examples may perform similar functions and/or achieve like results. All such equivalent embodiments and examples are within the spirit and scope of the present invention, are contemplated thereby, and are intended to be covered by the following claims.

What is claimed is:

1. A self-contained mobile living space comprising:
a trailer;
a bedroom and living structure;
a portable restroom;
a rooftop trellis;
a water utility system; and
a gray water system,
wherein the bedroom and living structure, the portable restroom, and the rooftop trellis are placed on top of the trailer in a functional arrangement,
wherein the trailer comprises (i) at least one step to allow an occupant to step up to the trailer, (ii) at least one set of wheels to move the trailer, (iii) a pallet placed on a surface of the trailer that supports the bedroom and living structure, the portable restroom, and the rooftop trellis, and (iv) at least one outdoor desk, and wherein the rooftop trellis comprises (i) at least one pillar that is configured to connect the rooftop trellis to the trailer, (ii) a ladder that connects the trailer to the rooftop trellis as to allow the occupant to climb up to the rooftop trellis from the trailer, and (iii) a rooftop garden that is irrigated by the water utility and the gray water systems.

2. The self-contained mobile living space of claim 1, wherein the bedroom and living structure comprises a foldable bed frame, a bench, a foldable desk, and a wall,
   wherein the foldable bed frame comprises a three-part sectional component,
   wherein the three-part sectional component comprises a head, a middle, and a bottom,
   wherein the head component is placed on top of the bench,
   wherein the middle component of the three-part sectional component is configured to fold upward towards a wall using a custom hinge, and
   wherein the custom hinge is configured to be hinged upward as to allow the bed frame to be held in an upright position, thereby creates additional space inside the bedroom and living structure.

3. The self-contained mobile living space of claim 2, wherein the foldable desk is located underneath the bed frame so that the foldable desk is exposed only when the bed frame is hinged upward.

4. The self-contained mobile space of claim 2, wherein the bedroom and living structure further comprises another bench that supports the bottom component of the foldable bed frame when the foldable bed frame is hinged downward for use.

5. The self-contained mobile living space of claim 1, wherein the trailer comprises a removable covering that encapsulates the trailer.

6. The self-contained mobile living space of claim 1, wherein the removable covering comprises at least one of: a window, a veil, a door, and any combinations thereof.

7. The self-contained mobile living space of claim 1, further comprising a set of braces that keep the trailer, the bedroom and living structure, the rooftop trellis, and the portable restroom in place when the trailer is in motion.

8. The self-contained mobile living space of claim 7, wherein the set of braces comprises at least one of: cross-brace, a single brace, an adjacent brace, and any combinations thereof.

9. The self-contained mobile living space of claim 1, wherein the trailer comprises a link at front of the trailer to be connected to a moving vehicle for transportation.

10. The self-contained mobile living space of claim 9, wherein the bedroom and living structure is placed at or near the front of the trailer.

11. The self-contained mobile living space of claim 9, wherein the portable restroom is placed at or near back of the trailer.

12. The self-contained mobile living space of claim 1, further comprising a solar system having a solar panel adhered to the rooftop trellis that is wired down to the bedroom and living structure and the portable restroom to provide electric power.

13. The self-contained mobile living space of claim 1, wherein the portable restroom comprises a shower stall, a composting toilet, and a urinal.

14. The self-contained mobile living space of claim 13, wherein the water utility system comprises:
   a water heater;
   a kitchen sink basin;
   a fresh water tank;
   an atmospheric water generator; and
   a vertical pressure pump,
   wherein the water heater is attached to the portable restroom and is configured to heat water for the kitchen sink basin and the shower stall,
   wherein the fresh water tank contains fresh water collected from rain or captured from the atmospheric water generator,
   wherein the vertical pump applies pressure to deliver the fresh water from the fresh water tank to the kitchen sink basin and the shower stall, and
   wherein the water heater, the kitchen sink basin, the fresh water tank, the atmospheric water generator, and the vertical pressure pump are connected to each other via at least one pipe line.

15. The self-contained mobile living space of claim 14, wherein the portable restroom comprises a sink opposite the kitchen sink basin and receives the fresh water from the fresh water tank.

16. The self-contained mobile living space of claim 14, wherein the atmospheric water generator is placed at a higher height than the fresh water tank as to deliver the fresh water to the fresh water tank using a gravitational force.

17. The self-contained mobile living space of claim 14, wherein the vertical pressure pump comprises an auto-detection feature that activates pump when faucets on the kitchen sink basin or the shower stall are activated.

18. The self-contained mobile living space of claim 14, wherein the gray water system comprises:
   a grease trap located underneath the kitchen sink basin;
   a kitchen sink drain connected from the kitchen sink basin to the grease trap so that waste material passes from the kitchen sink basin to the grease trap;
   a shower stall;
   a shower pump;
   a shower drain pipe configured to carry waste water from the shower stall to the shower pump; and
   a gray water output pipe,
      wherein the grease trap and the shower pump comprise filters with microorganisms that act as antibacterial agent, and
      wherein the grease trap separates solid waste from the waste water for treatment, and
      wherein the grease trap sends the treated waste water to the shower pump for further treatment.

19. The self-contained mobile living space of claim 18, wherein the treated waste water in the shower pump is used in irrigating the rooftop garden via the gray water output pipe which connects the shower pump to the rooftop garden.

20. The self-contained mobile living space of claim 1, wherein the self-contained mobile living space comprises at least one of: wood, metal alloys, plastics, rubber, foam, aluminum, and any combinations thereof.

* * * * *